US011514011B2

(12) United States Patent
Moscibroda et al.

(10) Patent No.: US 11,514,011 B2
(45) Date of Patent: Nov. 29, 2022

(54) COLUMN ORDERING FOR INPUT/OUTPUT OPTIMIZATION IN TABULAR DATA

(71) Applicant: MICROSOFT TECHNOLOGY LICENSING, LLC, Redmond, WA (US)

(72) Inventors: Thomas Moscibroda, Redmond, WA (US); Liang Jeff Chen, Redmond, WA (US); Xiao Huang, Redmond, WA (US); Ying Yan, Redmond, WA (US); Yueguo Chen, Redmond, WA (US); Xudong Zheng, Redmond, WA (US); Haoqiong Bian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 15/579,522

(22) PCT Filed: Jun. 3, 2016

(86) PCT No.: PCT/US2016/035607
§ 371 (c)(1),
(2) Date: Dec. 4, 2017

(87) PCT Pub. No.: WO2016/196856
PCT Pub. Date: Dec. 8, 2016

(65) Prior Publication Data
US 2018/0107696 A1    Apr. 19, 2018

(30) Foreign Application Priority Data

Jun. 4, 2015 (WO) ................ PCT/CN2015/080766
Jun. 29, 2015 (CN) .......................... 201510371595.6

(51) Int. Cl.
*G06F 16/22* (2019.01)
*G06F 16/2453* (2019.01)
(Continued)

(52) U.S. Cl.
CPC ........ *G06F 16/221* (2019.01); *G06F 16/2453* (2019.01); *G06F 16/2457* (2019.01);
(Continued)

(58) Field of Classification Search
CPC ............. G06F 16/221; G06F 16/24557; G06F 16/24553; G06F 16/2457; G06F 16/2453; G06F 17/18
See application file for complete search history.

(56) References Cited

U.S. PATENT DOCUMENTS 6,003,022 A * 12/1999 Eberhard ................ G06F 11/34
6,957,225 B1    10/2005 Zait et al.
(Continued)

FOREIGN PATENT DOCUMENTS

| CN | 102156714 A | 8/2011 |
| CN | 103324656 A | 9/2013 |
| CN | 104239447 A | 12/2014 |

OTHER PUBLICATIONS

"Office Action Issued in European Patent Application No. 16729456.0", dated May 24, 2019, 5 Pages.
(Continued)

*Primary Examiner* — Mariela Reyes
*Assistant Examiner* — Fernando M Mari Valcarcel

(57) ABSTRACT

Systems, methods, and computer-readable media for determining column ordering of a data storage table for search optimization are described herein. In some examples, a computing system is configured to receive input containing statistics of a plurality of queries. The computing system can then determine a new column order (i.e., layout) based at least in part on the statistics. In some example techniques described herein, the computing system can determine the new column order based at least in part on the hardware components storing the data storage table, storage system
(Continued)

parameters, and/or user preference information. Example techniques described herein can apply the new column order to data subsequently added to the data storage table. Example techniques described herein can apply the new column order to existing data in the data storage table.

20 Claims, 6 Drawing Sheets

(51) Int. Cl.
   *G06F 16/2457* (2019.01)
   *G06F 16/2455* (2019.01)
   *G06F 17/18* (2006.01)
(52) U.S. Cl.
   CPC .. *G06F 16/24553* (2019.01); *G06F 16/24557* (2019.01); *G06F 17/18* (2013.01)

(56) References Cited

U.S. PATENT DOCUMENTS

| | | | |
|---|---|---|---|
| 9,141,665 B1* | 9/2015 | Munro | G06F 16/2453 |
| 2003/0158842 A1* | 8/2003 | Levy | G06F 16/24532 |
| 2003/0212694 A1* | 11/2003 | Potapov | G06F 16/24557 |
| 2006/0206465 A1 | 9/2006 | Schmitz et al. | |
| 2008/0040348 A1* | 2/2008 | Lawande | G06F 16/221 |
| 2008/0059482 A1* | 3/2008 | Rohan | G06Q 90/00 |
| 2008/0059492 A1* | 3/2008 | Tarin | G06F 16/221 |
| 2009/0254516 A1* | 10/2009 | Meiyyappan | G06F 16/134 707/999.005 |
| 2009/0319487 A1 | 12/2009 | Carlin et al. | |
| 2011/0208754 A1* | 8/2011 | Li | G06F 16/2282 707/750 |
| 2011/0213766 A1* | 9/2011 | Hong | G06F 16/284 707/718 |
| 2012/0047189 A1* | 2/2012 | Staffer | G06F 16/1727 707/830 |
| 2012/0254252 A1* | 10/2012 | Jin | G06F 16/221 707/797 |
| 2013/0204813 A1* | 8/2013 | Master | G06N 20/00 706/12 |
| 2013/0304756 A1* | 11/2013 | Conradi | G06Q 10/10 707/766 |
| 2014/0281247 A1 | 9/2014 | Loaiza et al. | |
| 2014/0324881 A1* | 10/2014 | Ransil | G06F 16/278 707/741 |
| 2015/0019583 A1* | 1/2015 | Mittelstadt | G06F 16/24537 707/765 |
| 2015/0199393 A1* | 7/2015 | Friske | G06F 16/2282 707/803 |
| 2015/0347426 A1* | 12/2015 | Dickie | G06F 16/122 707/693 |
| 2015/0356137 A1* | 12/2015 | Andros | G06F 16/2453 707/715 |
| 2015/0358835 A1* | 12/2015 | Keisala | H04W 60/00 455/435.1 |
| 2015/0370898 A1* | 12/2015 | Ahmed | G06F 16/48 707/723 |

OTHER PUBLICATIONS

"Second Office Action Issued in Chinese Patent Application No. 201510371595.6", dated Jun. 5, 2019, 6 Pages.
"Apache Drill", Retrieved From: http://drill.apache.org/, Retrieved at: Feb. 15, 2019, 5 Pages.
"Genetic Algorithm", Retrieved From: http://en.wikipedia.org/wiki/genetic algorithm, Retrieved at: Feb. 15, 2019, 15 Pages.
"Apache Impala", Retrieved From: http://impala.io/, Retrieved at: Sep. 9, 2019, 1 Page.
"Galib: Matthew's Genetic Algorithms Library", Retrieved From: http://lancet.mit.edu/ga/, Retrieved at: Feb. 15, 2019, 1 Page.
Microsoft Research "Dryad", Retrieved From: http://research.microsoft.com/en-us/projects/dryad/, Dec. 16, 2004, 4 Pages.
"Apache Spark SQL", Retrieved From: http://spark.apache.org/sql/, Retrieved at: Feb. 15, 2019, 3 Pages.
"WatchMaker Framework", Retrieved From: http://watchmaker.uncommons.org/, Retrieved at: Feb. 15, 2019, 2 Pages.
Leverenz, Lefty "languageManual ORC", Retrieved From: https://cwiki.apache.org/confluence/display/hive /languagemanual+orc, Jun. 17, 2018, 5 Pages.
"Presto: Distributed SQL Query Engine for Big Data", Retrieved From: https://prestodb.io/, Retrieved at: Feb. 15, 2019, 2 Pages.
"First Office Action and Search Report Issued in Chinese Patent Application No. 201510371595.6", dated Dec. 29, 2018,16 Pages.
Abadi, et al., "Column-stores vs. row-stores: how different are they really?", In Proceedings of the ACM SIGMOD International conference on Management of data, Jun. 9, 2008, 14 Pages.
Abadi, et al., "The design and implementation of modern column-oriented database systems", In Proceedings of the Foundations and Trends in Databases, vol. 5, Issue 3, Jan. 1, 2013, 87 Pages.
Agarwal, et al., "Blinkdb: queries with bounded errors and bounded response times on very large data", In Proceedings of the EuroSys, 2013, Apr. 15, 2013, 14 Pages.
Arpaci-Dusseau, et al., "Hard disk drives. In Operating Systems: Three Easy Pieces", In Arpaci-Dusseau Books, 0.80 edition, Mar. 1, 2014, 4 Pages.
Bian, et al., "Taming Big Wide Tables: Layout Optimization based on Column Ordering", In Proceedings of the ACM Symposium on Cloud Computing, Aug. 27-29, 2015, pp. 1-12.
Chaiken, et al., "SCOPE: easy and efficient parallel processing of massive data sets", In Proceedings of the VLDB Endowment, vol. 1, Issue 2, Aug. 23, 2008, 12 Pages.
Guo, et al., "Mastiff: A mapreduce-based system for time-based big data analytics", In Proceedings of the IEEE International Conference on Cluster Computing, Jan. 1, 2012, 9 Pages.
He, et al., "Rcfile: A fast and space-efficient data placement structure in mapreduce-based warehouse systems", In Proceedings of the IEEE 27th International Conference on Data Engineering, Jan. 1, 2011,10 Pages.
Huai, et al., "Understanding insights into the basic structure and essential issues of table placement methods in clusters", In Proceedings of the VLDB Endowment, vol. 6, Issue 14, Aug. 26, 2013, pp. 1750-1761.
Jindal, et al., "Trojan data layouts: right shoes for a running elephant", In Proceedings of the 2nd ACM Symposium on Cloud Computing, Oct. 27, 2011,14 Pages.
Lei, et al., "Shared execution of recurring workloads in mapreduce", In Proceedings of the VLDB Endowment, vol. 8, Issue 7, Aug. 31, 2015, pp. 714-725.
Li, et al., "Widetable: An accelerator for analytical data processing", In Proceedings of the VLDB Endowment, vol. 7, Issue 10, Sep. 1, 2014, 12 Pages.
Manikas, et al., "Genetic algorithms vs. simulated annealing: A comparison of approaches for solving the circuit partitioning problem", Retrieved From: https://scholar.smu.edu/engineering_compsci_research/1/, Jan. 1, 1996, 2 Pages.
Nourani, et al., "A comparison of simulated annealing cooling strategies", In Journal of Physics A: Mathematical and General, vol. 31, Issue 41, Jan. 1, 1998, 13 Pages.
Nykiel, et al., "Mrshare: sharing across multiple queries in mapreduce", In Proceedings of the VLDB Endowment, vol. 3, Issue 1, Jan. 1, 2010, 12 Pages.
Olston, et al., "Pig latin: A not-so-foreign language for data processing", In Proceedings of the ACM SIGMOD international conference on Management of data, Jun. 9, 2008, 12 Pages.
"International Preliminary Report on Patentability Issued in PCT Application No. PCT/US2016/035607", dated Aug. 17, 2017, 9 Pages.
"Second Written Opinion Issued in PCT Application No. PCT/US2016/035607", dated Apr. 12, 2017, 8 Pages.
Sacca, et al., "Database partitioning in a cluster of processors", In Proceedings of the ACM Transactions on Database Systems, vol. 10, Issue 1, Jan. 1, 1985, 6 Pages.

(56) References Cited

OTHER PUBLICATIONS

Stonebraker, et al., "C-store: A column-oriented DBMS", In Proceedings of the 31st VLDB Conference, Jan. 1, 2005, 12 Pages.
Szu, et al., "Fast simulated annealing", In Proceedings of the Physics letters A, vol. 122, Issue 3, Jan. 1, 1987, 6 Pages.
Taghadosi, et al., "Importance of the initial conditions and the time schedule in the simulated annealing", In R. Chibante, editor, Simulated Annealing, Theory with Applications, chapter 12, Aug. 1, 2010, pp. 217-234.
Thusoo, et al., "Hive—a petabyte scale data warehouse using hadoop", In Proceedings of the IEEE 26th International conference on data engineering, Jan. 1, 2010, 10 Pages.
Wang, et al., "Multi-query optimization in mapreduce framework", In Proceedings of the VLDB Endowment, vol. 7, Issue 3, Sep. 1, 2014, 12 Pages.
Whitley, Darrell "A genetic algorithm tutorial", In Proceedings of the Statistics and computing, vol. 4, Issue 2, Jan. 1, 1994, 37 Pages.
Xin, et al., "Shark: Sql and rich analytics at scale", In Proceedings of the ACM SIGMOD International Conference on Management of data, Jun. 22, 2013, 12 Pages.
Yan, et al., "Error-bounded sampling for analytics on big sparse data", In Proceedings of the VLDB Endowment, vol. 7, Issue 13, Sep. 1, 2014, 12 Pages.
Zaharia, et al., "Spark: Cluster computing with working sets", In Proceedings of the HotCloud, Jan. 1, 2014, 7 Pages.
International Search Report and Written Opinion for PCT/US2016/035607, dated Aug. 19, 2016.
Harizopoulos et al., "Performance Tradeoffs in Read-Optimized Databases", Proceedings of the Twenty-Seventh International Conference on Very Large Data Bases (2006): 487-498.
Graefe, "Implementing Sorting in Database Systems", ACM Computing Surveys, vol. 38(3), Article 10 (2006): 1-37.
"Third Office Action Issued in Chinese Patent Application No. 201510371595.6", dated Nov. 5, 2019, 17 Pages.
"Fourth Office Action Issued in Chinese Patent Application No. 201510371595.6", dated Jun. 22, 2020, 11 Pages.

* cited by examiner

COLUMN ORDERING FOR INPUT/OUTPUT OPTIMIZATION IN TABULAR DATA

CROSS-REFERENCE TO RELATED APPLICATION

This application is a U.S. National Stage Application of PCT/US2016/035607, filed Jun. 3, 2016, which claims benefit of International Patent Application No. PCT/CN2015/080766, filed Jun. 4, 2015, and Chinese Patent Application No. 201510371595.6, filed Jun. 29, 2015, which applications are hereby incorporated by reference. To the extent appropriate, a claim of priority is made to each of the above disclosed applications.

BACKGROUND

As the world becomes more connected through technology, a greater number of people need to store and access data. Such data is typically stored in two-dimensional tables comprising rows and columns. Traditionally, the data was organized in a row store format. As the tables have increased in size, however, more storage systems have moved to a column store format. Data storage tables now comprise thousands of columns of data, and continue to grow every day. As data is stored, new columns may be added to the table. Because most systems store data sequentially as the data is input, two unrelated columns of data may be stored adjacent to one another. In a table with thousands of columns, with relevant columns spaced far apart, the query can be very computationally expensive.

SUMMARY

This disclosure describes systems, methods, and computer-readable media for determining column ordering of a table for input/output optimization, such as, for search examples, a computing system is configured to receive input containing statistics of a plurality of queries. The computing system may then determine a new column order (e.g., table layout) based at least in part on the statistics. In some example techniques described herein, the computing system can determine the new column order based at least in part on the hardware components storing the table, storage system parameters, and/or user preference information. Example techniques described herein can apply the new column order to data subsequently added to the table. Example techniques described herein can apply the new column order to existing data in the table.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to systems, methods, computer-readable instructions, modules, algorithms, hardware logic and/or operations as permitted by the context described above and throughout the document. Furthermore, the claimed subject matter is not limited to implementations that solve any or all disadvantages noted in any part of this disclosure.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
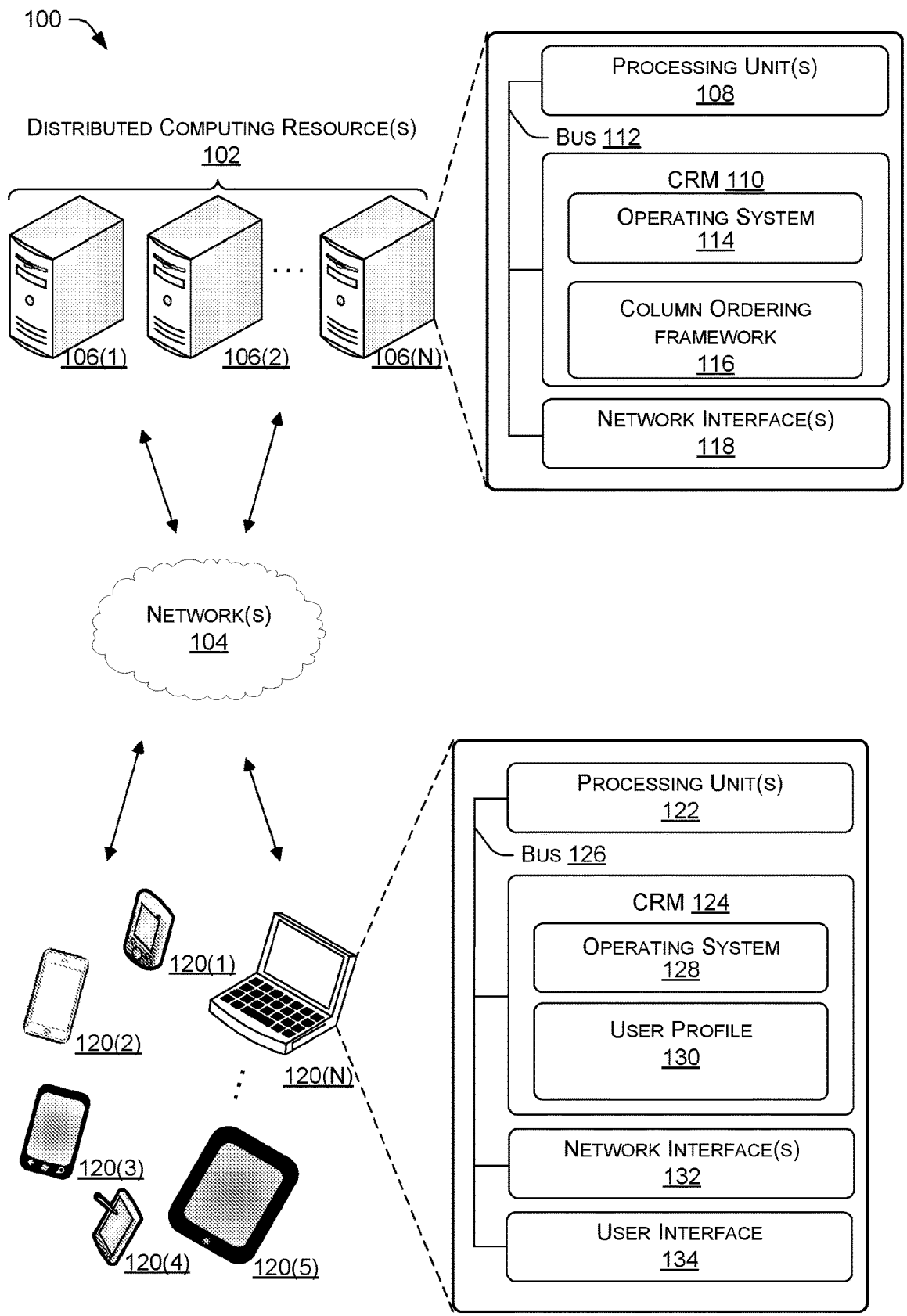
FIG. 1 is a block diagram depicting an example environment in which examples of column ordering for input/output optimization can operate.

The technologies described herein provide techniques and constructs to improve the speed of input/output operations from tabular storage for data analytics and processing, such as for providing a response to a search query, by reordering the column order of a table. In some examples, a computing system can receive statistics related to multiple queries for information. The statistics can include a frequency of the query (e.g., query A appeared 6 times over the last week), a list of the columns accessed per query (e.g., query A accessed columns 5, 13, and 68), a time stamp for the query (e.g., query A appeared at 1615 GMT on Jul. 17, 2014), a seek cost for the query (e.g., computational complexity of the query), and/or other information related to the query.

In various examples, the computing system can assign a weight to each query based on the statistics. For instance, a query with a high frequency can be weighted higher than another query with a lower frequency. Additionally or alternatively, the computing system can assign a weight based on user preferences. For instance, the computing system can receive an indication from a user that a particular query is of high importance to the user. The computing device can save the user preference information, such as, for example, in a user profile, and can assign a higher weight to the query.

In some examples, the computing system can analyze the hardware components storing the table. The analysis can comprise determining a seek cost function for the hardware component. For instance, a table stored on a hard disk drive (HDD) may be affected by a delay of track seek (i.e., the delay of moving the head to a track or cylinder) and a delay of disk rotation (i.e., the time it takes for the desired sector to rotate to the head). Two types of HDDs, HDD1 and HDD2, may have different seek cost functions based on, for example, a disk rotation speed. In various examples, the computing system can apply a seek distance (e.g., a distance between columns) to the seek cost function of the hardware component to determine a seek cost for a query. Other hardware components can have different cost functions that relate the cost of accessing different columns in the table.

Additionally or alternatively, the computing system can analyze one or more system parameters. The one or more system parameters can comprise a column compression, a row size, a data type, a row type, and/or any other parameters related to the data storage.

Based on the input statistics, user preferences, analysis of the hardware component and/or system parameters, the computing device can determine a new order for the plurality of columns. This new order is optimized for the query input statistics such that the total input/output cost to serve the query workload is minimized when storing the data in the new order. In various examples, the computing system can apply the new order to data subsequently added to the table. In some examples, the computing system can apply the new order to previously saved data by resaving the plurality of columns in the new order. By reordering the columns of a table, whether including preexisting data or applied to subsequently saved data, the time required for the Input/Output (I/O) process can be minimized, thereby having the effect of increasing the efficiency of the queries and decreasing the time required to respond to the queries, such as data analytics queries and/or search queries.

Illustrative Environment

The environment described below constitutes but one example and is not intended to limit the claims to any one particular operating environment. Other environments can be used without departing from the spirit and scope of the claimed subject matter.

FIG. 1 shows an example environment 100 in which ordering columns of a table for input/output optimization can be implemented. In some examples, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(N). Embodiments support scenarios where device(s) 106 can include one or more computing devices that operate in a cluster or other grouped embodiment to share resources, balance load, increase performance, provide fail-over support or redundancy, or for other purposes. Device(s) 106 can belong to a variety of categories or classes of devices such as traditional server-type devices, desktop computer-type devices, mobile devices, special purpose-type devices, embedded-type devices, and/or wearable-type devices. Thus, although illustrated as desktop computers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) 106 can include any type of computing device having one or more processing unit(s) 108 operably connected to computer-readable medium (CRM) 110 such as via a bus 112, which in some instances can include one or more of a system bus, a data bus, an address bus, a PCI bus, a Mini-PCI bus, and any variety of local, peripheral, and/or independent buses. Executable instructions stored on CRM 110 can include, for example, an operating system 114, a column ordering framework 116, and other modules, programs, or applications that are loadable and executable by processing units(s) 108. Additionally or alternatively, the functionally described herein can be performed, at least in part, by one or more hardware logic components such as accelerators. For example, and without limitation, illustrative types of hardware logic components that can be used include Field-Programmable Gate Arrays (FPGAs), Application-specific Integrated Circuits (ASICs), Application-Specific Standard Products (ASSPs), System-on-a-Chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Device 106 can also include one or more network interfaces 118 to enable communications between computing device 106 and other networked devices such as client computing device(s) 120 through which a client can submit query, and/or user preferences. Such network interface(s) 118 can include one or more network interface controllers (NICs) or other types of transceiver devices to send and receive communications over a network. For simplicity, other components are omitted from the illustrated device 106.

Other devices involved in ordering columns of a table for input/output optimization, can include client computing devices 120(1)-120(N). Device(s) 120 can belong to a variety of categories or classes of devices such as traditional client-type devices, desktop computer-type devices, mobile devices, special purpose-type devices, embedded-type devices, and/or wearable-type devices. Thus, although illustrated as mobile computing devices, which can have less computing resources than device(s) 106, client computing device(s) 120 can include a diverse variety of device types and are not limited to any particular type of device. Client computing device(s) 120 can include, but are not limited to, computer navigation type client computing devices 120(1) such as satellite-based navigation systems including global positioning system (GPS) devices and other satellite-based navigation system devices, telecommunication devices such as mobile phone 120(2) mobile phone tablet hybrid 120(3), personal data assistants (PDAs) 120(4), tablet computers 120(5), laptop computers such as 120(N), other mobile computers, wearable computers, implanted computing devices, desktop computers, personal computers, automotive computers, network-enabled televisions, thin clients, terminals, game consoles, gaming devices, work stations, media players, personal video recorders (PVRs), set-top boxes, cameras, integrated components for inclusion in a computing device, appliances, or any other sort of computing device.

Client computing device(s) 120 can represent any type of computing device having one or more processing unit(s) 122 operably connected to CRM 124 such as via a bus 126, which in some instances can include one or more of a system bus, a data bus, an address bus, a PCI bus, a Mini-PCI bus, and any variety of local, peripheral, and/or independent buses.

Executable instructions stored on CRM 124 can include, for example, an operating system 128, a user profile system 130 for accessing and applying user preferences, and other modules, programs, or applications that are loadable and executable by processing units(s) 122. Additionally or alternatively, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Client computing device 120 can also include one or more network interfaces 132 to enable communications between client computing device 120 and other networked devices such as other client computing device(s) 120 or devices 106 over network(s) 104. Such network interface(s) 132 can include one or more network interface controllers (NICs) or other types of transceiver devices to send and receive communications over a network.

Client computing device 120 can also include a user interface 134 to enable the device 120 to receive user input regarding the column ordering. Examples support the user interface 134 receiving input from the user to enable and disable the column ordering system, to specify a threshold for reordering and to apply the column order to subsequently added, and/or pre-existing data. Additionally or alternatively, the user interface 134 can receive input from a user specifying input/output query preferences and/or system parameter preferences, thereby affecting the resulting column ordering.

In various examples, the user interface 134 can communicate user input to column ordering framework 116 on device 106, such as, via network interface(s) 132 and 118. In such examples, column ordering framework 116 may calculate a new column order based at least in part on the user input.

Figure 2:
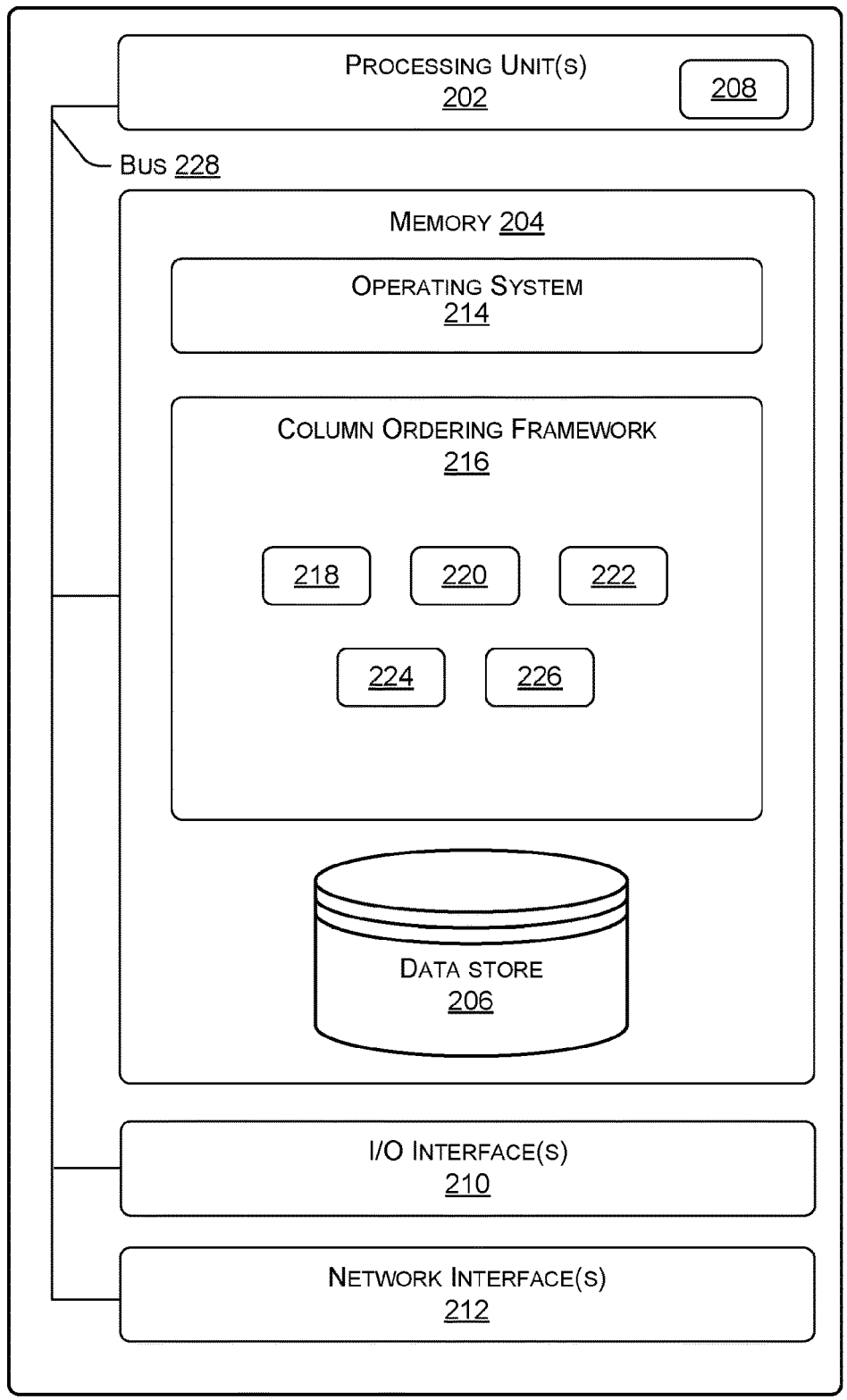
FIG. 2 is a block diagram depicting an example computing device of configured to participate in a column ordering for input/output optimization system.

FIG. 2 is a block diagram depicting an example computing device 200 configured to participate in a column ordering for input/output optimization system. In some examples, computing device 200 may be one computing device of a distributed computing resource, such as a device 106 from FIG. 1. In device(s) 200, processing unit(s) 202, can include processing unit(s) 108 and can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, memory 204 can represent CRM 110 and can store instructions executable by the processing unit(s) 202, which as discussed above, can represent a processing unit incorporated in device 200. Memory 204 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in device 200, while in some examples one or more of a CPU, GPU, and/or accelerator is external to device 200.

In the illustrated example, memory 204 also includes a data store 206. In some examples, data store 206 includes data storage such as a database, data warehouse, or other type of structured or unstructured data storage. In some examples, data store 206 includes a corpus and/or a relational database with one or more tables, indices, stored procedures, and so forth to enable data access such as web tables including one or more of hypertext markup language (HTML) tables, resource description framework (RDF) tables, web ontology language (OWL) tables, and/or extensible markup language (XML) tables, for example. Data store 202 can store data for the operations of processes, applications, components, and/or modules stored in memory 204 and/or executed by processing unit(s) and/or accelerator(s) 202. Alternately, some or all of the above-referenced data can be stored on separate memories 208 on board one or more processing unit(s) 202 such as a memory on board a CPU-type processor, a GPU-type processor, an FPGA-type accelerator, a DSP-type accelerator, and/or another accelerator.

Device(s) 200 can further include one or more input/output (I/O) interfaces 210 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 200, network interface(s) 212, which can be network interface(s) 118, can represent, for example, network interface controllers (NICs) or other types of transceiver devices to send and receive communications over a network.

In the illustrated example, memory 204 also includes an operating system 214, which can be operating system 114. Memory 204 also includes a column ordering framework 216, which can be column ordering framework 116. Column ordering framework 216 can include one or more modules and/or APIs, which are illustrated as blocks 218, 220, 222, 224, and 226, although this is just an example, and the number can vary higher or lower.

Functionality described associated with blocks 218, 220, 222, 224, and 226 can be combined to be performed by a fewer number of modules and/or APIs or it can be split and performed by a larger number of modules and/or APIs. For example, block 218 can represent a workload manager module extraction module with logic to program processing unit 202 of device 200 for extraction of a plurality of query statistics (e.g., a number of queries, a type of query, a list of columns accessed per query, and any other statistics relevant to the column ordering operation). In some examples, the plurality of statistics may be stored on computing device 200, such as, for example, in data store 206. In some examples, the plurality of statistics can be extracted or received from a remote computing device, such as via the network interface 212, and stored in data store 206.

The workload manager module may obtain the plurality of statistics periodically, such as, for example, at a specified time each day. In some examples, the periodic interval can be determined by a program manager (e.g., monthly, weekly, daily). In some examples, the workload manager module can obtain or access data when manually directed by the program manager.

In some examples, the workload manager module can input the statistics regarding the processed queries, and can determine a weight of each query. For example, a query with a high frequency, e.g., a query that has been processed 1.5, 2.5, 10 times more than another query, may be given a higher weight than lower frequency queries. As another example, a query that accesses ten columns can be given a higher weight than a query that accesses two columns, based at least on the computational cost of accessing ten columns (i.e., the more computationally expensive a query, the greater improvement to be derived by increasing the efficiency of the query).

Block 220 can represent a user preference module. In various examples, the user preference module may store one or more user profiles. The one or more user profiles can include user preferences with respect to a query. For example, a user can input a preference for a particular query, thereby indicating that the query is important to the user. The user preference module can process the user preference information, and assign a high weight to the query, regardless of other query statistics.

In some examples, the user profiles can be associated with a service provider, such as, for example, a cloud service provider. In such examples, the user preference module can give preferential treatment to some users and not to others. For instance, a paying customer of the service provider can receive preferential treatment over a non-paying customer. Additionally or alternatively, the user preference module can receive the inputs from multiple user profiles, and can assign weights to queries designated as important to the customers in a consistent manner. For instance, customers of the same ilk, i.e., all non-paying customers, can be treated the same, and queries will be weighted based on an overall consistency for the customers (e.g., resulting increase in efficiency of searches will be similar for non-paying customers).

Block 222 can represent a hardware simulator module with logic to program processing unit 202 for extraction of data related to the hardware component on which the table is stored. The data related to the hardware component can include a type (e.g., electronic, magnetic, optical, mechanical, etc.), performance characteristics (e.g., access time, average latency, data rate, etc.), a capacity (e.g., storage size). For example, the hardware simulator module can determine that the data is stored on a 2 TB HDD with a 64 MB cache, and a rotation speed of 7,200 RPM and a Serial ATA of 6.0 Gb/s, or some other configuration.

In some examples, the hardware simulator module can comprise logic to determine a seek cost function related to the hardware component. The seek cost function can abstract the actual properties of the physical hardware component and can vary across different models, versions and/or stock keeping units (SKUs). In various examples, the hardware simulator module can include logic to determine a seek cost for a query by applying a seek distance (i.e., a distance between columns) to the seek cost function. In such examples, the hardware simulator module can determine a computational cost of a query for a particular hardware component.

Block 224 can represent system setting module with logic to program processing unit 202 of device 200 for extracting one or more system parameters associated with the data storage. The system parameters can comprise a column compression, a row size, a data type, a row type, and any other parameters related to the data storage.

Block 226 can represent an order generating module with logic to program processing unit 202 of device 200 for generating a new column ordering strategy. The order generator module can receive input from one or more modules including the workload manager module, the user preference module, the hardware simulator module, and/or the system setting module. The input can comprise weighted queries, user preferences, seek costs, and/or system parameters. The order generator module can process the input, and determine a new column order. In some examples, the order generator module can test the efficacy of the new column order prior to implementation.

In various examples, block 226 can comprise logic to program processing unit 202 to apply the new column ordering strategy to the table. The implementation can apply to subsequently added data and/or to existing data stored in the table.

Bus 228, which can be bus 112, and which in some instances can include one or more of a system bus, a data bus, an address bus, a PCI bus, a Mini-PCI bus, and any variety of local, peripheral, and/or independent buses, can operably connect memory 204 to processing unit(s) 202.

Figure 3:
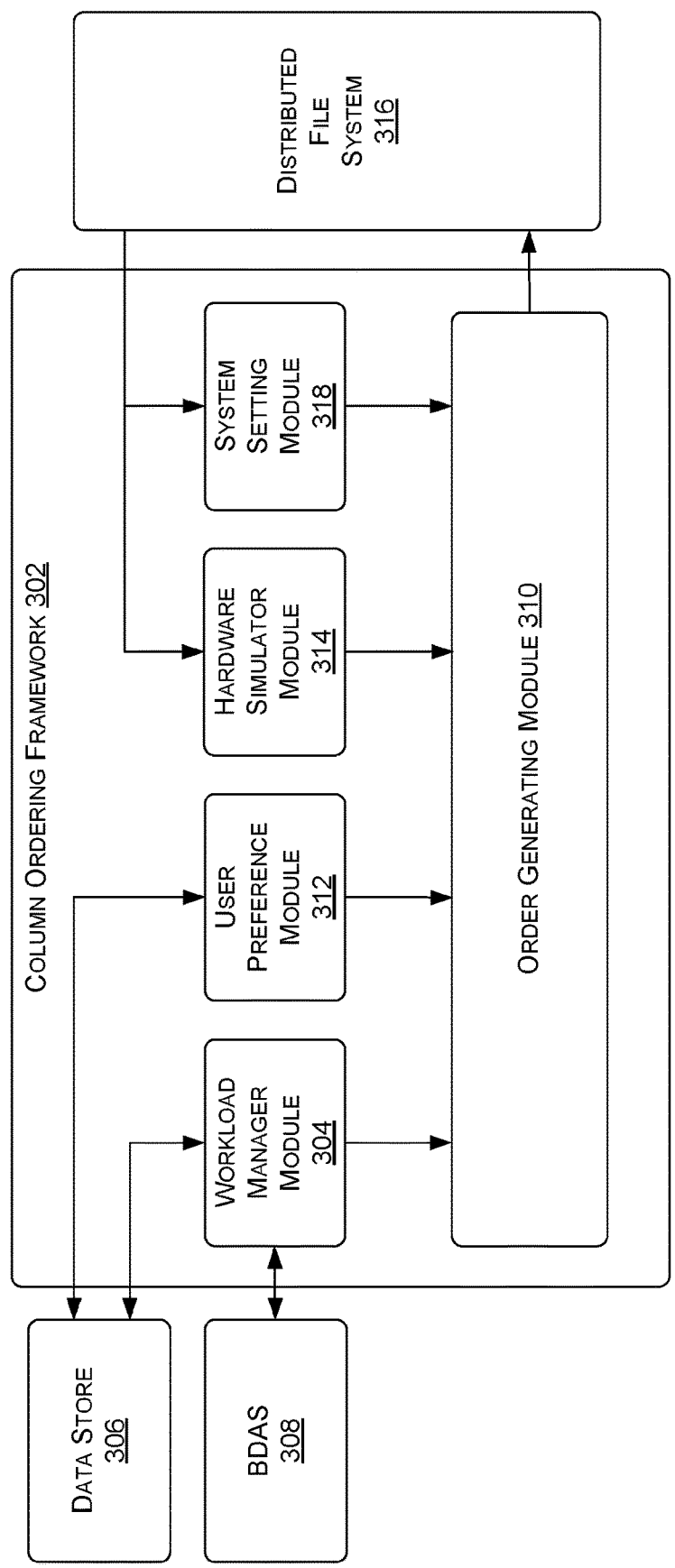
FIG. 3 is a dataflow diagram depicting example module interactions during operation of column order evaluation and reordering for input/output optimization.

FIG. 3 is a dataflow diagram 300 illustrating example interactions between modules of the column ordering framework 302, such as column ordering framework 216. Column ordering framework 302 can process a plurality of data, and output a new column order for optimizing input/output, such as for a search.

In various examples, workload manager module 304, such as the workload manager module depicted in block 218, can receive a plurality of query statistics associated with one or more queries from data store 306. The query statistics can include, but are not limited to, a number of queries, a frequency of a query, a type of query, and a list of columns accessed per query. In some examples, a big data analytic system (BDAS) 308 (e.g., Spark, Scope, MapReduce, etc.) can track all queries to a particular table, and can continually process and store the statistics associated with each query. The BDAS 308 can subsequently send the query statistics to the workload manager module 304 via the data store 306. In some examples, the workload manager module 304 can receive the query statistics directly from the BDAS 308, and can subsequently store the most recent statistics in the data store 306.

The workload manager module 304 can receive the plurality of statistics associated with queries periodically, such as, for example, at a designated time each day, week or month. In some examples, the periodic interval can be determined by a program manager, which can be internal or external to the workload manager module 304. In some examples, the program manager can automatically instruct the BDAS 308 to send updated query statistics at a periodic interval. In some examples, the program manager can manually instruct the BDAS 308 to send the updated query statistics. For example, the program manager can determine that a higher than normal number of queries have been asked of a particular table. The program manager can subsequently instruct the BDAS 308 to send an updated query in between periodic intervals based on the increase in queries.

In some examples, the workload manager module 304 can input the query statistics, and can determine a weight of each query, the weight being an indication of relative importance to the column ordering for input/output optimization. For example, a query with a high frequency, e.g., a query that has been processed 1.5, 2.5, or 10 or more times more than another query, can be given a higher weight than lower frequency queries. As another example, a query that accesses twenty columns can be given a higher weight than a query that accesses fewer columns, based at least on the computational cost of accessing twenty columns (i.e., the more computationally expensive a query, the greater the improvement to be derived by increasing the efficiency of the query).

The workload manager module 304 can send the weights associated with each query and relevant statistics, to the order generating module 310. For example, relevant statistics can comprise the columns associated with each query, and any other data relevant to generating a new column order for input/output optimization.

Order generating module 310 can receive input from one or more modules, such as workload manager module 304, user preference module 312, hardware simulator module 314, and/or system setting module 318, in various examples. Order generating module 310 may receive input from any combination of the foregoing modules. For example, order generating module 310 can receive input from workload manager module 304 and hardware simulator module 314. As another example, order generating module 310 can receive input from workload manager module 304, user preference module 312, hardware simulator module 314, and system setting module 318.

In some examples, the order generating module 310 can receive query weights from a user preference module 312. The user preference module 312 can access and/or store user preferences, such as, for example, in a user profile. In various examples, the user preferences can be stored in data store 306, and accessed by the user preference module 312. The user preferences can comprise an indication that one or more queries is important to a particular user. For example, a user can input a preference for a particular query, thereby indicating that the query is important to the user.

The user preference module 312 can process the user preference information, and assign a weight to the query. In some examples, the user preference module can evaluate received preference information and determine a weight based at least in part on the preference information. For example, if the user indicates that a query is of high importance, the user preference module can assign a heavy weight to the query. For another example, if the user indicates that the query is of medium to low importance, the user preference module can assign a lower weight to the query.

In some examples, the user preference module 312 can evaluate the source of the received preference information, and adjust the weight based on a particular source (i.e., a particular user). For example, a user paying for a cloud providing service can receive preferential treatment over a non-paying customer. In such an example, the user preference module can increase the weight of a query preference for the paying customer and/or can decrease the weight of a query preference for the non-paying customer. For another example, users within each paying or non-paying categories can receive preferential treatment, such as, for example, users within different sub-categories. For instance, a user paying for a platinum service can receive preferential treatment over a user paying for a gold or silver service.

Additionally or alternatively, the user preference module 312 can receive user preference information from a plurality of users, and can calculate weights based on a consistency scale. The consistency scale can comprise distribution of improved query return performance across all users, a category and/or a sub-category of users. In various examples, the user preference module 312 can calculate and/or adjust the weights for queries in such a way that would result in a new column order that provides maximum query return performance across all users. In such an example, the user preference module 312 can balance query preferences across all users, and determine the maximum benefit for the greatest number of users. In some examples, the user preference module 312 can calculate and/or adjust the weights for queries in such a way that would result in a new column order that provides greater query return performance for some users and not others. For example, two users of the same sub-category can experience relatively equivalent query return performance; however users of higher sub-categories can experience better query return performance.

In various examples, the user preference module 312 can send the processed weights to order generating module 310. Based at least in part on the importance of queries to users, the order generating module 310 can determine a new column order for input/output optimization.

Order generating module 310 can receive input from hardware simulator module 314, which can be hardware simulator module represented at block 222, can process data related to one or more hardware components on which the table is stored. The data related to the hardware components can comprise a type (e.g., electronic, magnetic, optical, mechanical, etc.), performance characteristics (e.g., access time, average latency, data rate, etc.), a capacity (e.g., storage size). For example, the hardware simulator module can determine that the data is stored on a 2 TB HDD with a 64 MB cache, and a rotation speed of 7,200 RPM and a Serial ATA of 6.0 Gb/s, or some other configuration.

In various examples, the hardware simulator module 314 can receive the data related to the one or more hardware components from a distributed file system 316. The distributed file system 316 can comprise a Hadoop Distributed File System (HDFS), a Cosmos Distributed File System (CDFS), or any other type of distributed file system capable of representing data as a two-dimensional table. In some examples, the distributed file system 316 can be saved internally to a computing device, such as computing device 200. In such an example, the distributed file system 316 can be saved in the data store, such as data store 206. In some examples, the distributed file system 316 can be saved across multiple computing devices, such as in distributed computing resource 102. The distributed file system 316 can comprise one or more hardware components, upon which a table is stored, and can provide data related to the one or more hardware components to the hardware simulator module 314.

The hardware simulator module 314 can process the data, and can determine a seek cost of each hardware component (e.g., cost of a disk seek). The seek cost of the hardware component can be largely dependent on a seek distance between two columns accessed saved to the hardware component, such as, for example, columns i and j. The seek distance between columns i and j can be calculated as follows:

$$\mathrm{dist}(i,j)=|b(j)-e(i)|$$

b(i) is the offset of the first byte of the data object i in the file; and e(i) is the offset of the byte next to the last byte of i. Thus, e(i)=b(i)+s(i).

Additionally, the hardware simulator module 314 can determine a seek cost function related to the hardware component. The seek cost function abstracts the actual properties of the physical hardware component and can vary across different stock keeping units (SKUs). In various examples, such as examples storing tables on HDDs, the hardware simulator module 314 can apply curve fitting to determine the seek cost function related to the hardware components. In such examples, the hardware simulator module 314 can first select a set of blocks randomly distributed on different zones (i.e., different offsets) of the disks in a homogeneous cluster, the homogeneous cluster being disks of the same hardware. The hardware simulator module 314 can then perform read-and-seek operations of different seek distances in each blocks of the set of blocks, and can record the elapsed time (i.e., seek time) of each seek operation. The hardware simulator module 314 can calculate an average seek time. After calculating an average seek time, the hardware simulator module 314 can fit the curve with the seek distances and the corresponding average seek time.

While the above described example is specific to HDDs, it is understood that other seek cost function processes can be implemented by evaluating other hardware components, such as, for example, flash drives. For each type of hardware component, the seek function can be different. Thus, for heterogeneous hardware components in a storage system, the hardware simulator can determine a seek function for each type of hardware component. However, to reduce computational complexity, in some examples, the hardware simulator module 314 can apply a generic seek function to heterogeneous hardware components. After determining the seek function, the hardware simulator module 314 can calculate the seek cost from one column to another.

To calculate the seek cost between two columns, the hardware simulator module 314 can apply the seek distance, as described above, to the cost function. Thus, given the two columns i and j, the seek cost from i to j can be modeled as:

$$\mathrm{Cost}(i,j)=f(\mathrm{dist}(i,j)).$$

The hardware simulator module 314 can send the seek cost of the hardware component to the order generating module 310. In some examples, the hardware simulator module 314 can additionally send the seek cost function of the hardware component to the order generating module 310. However, the algorithms of the order generating module 310 are generally agnostic to the seek function, and thus apply generally to different storage media.

In various examples, the order generating module 310 can also receive system parameters from system setting module 318. In various examples, the system setting module 318 can receive system parameters from distributed file system 316. The system parameters can comprise a column compression, a row size, a data type, a row type, and any other parameters related to the data storage.

As outlined above, order generating module 310 receives input from workload manager module 304, user preference module 312, hardware simulator module 314, and system setting module 316. The input can comprise weighted queries, user preferences, seek costs, and/or system parameters. The order generator module can process the input, and determine a new column order.

Column Ordering Problem

Very large tables, with hundreds or thousands of columns, can require great computational costs to return a result from a query. The following discussion explains the column ordering problem, as a function of the query seek cost.

A query q generally accesses a subset of columns, which can be represented as:

$$C_q=\{c_{q,1},c_{q,2},\ldots,c_{q,m}\},$$

where $C_q$ represents the columns that q must access following a global order of S, where m≤n, and $c_{q,i}$ represents the $i^{th}$ column accessed by q. Therefore, $c_{q,i}$ must appear before $c_{q,j}$ in S if i<j. In other words, the accessed columns for q follow the same order of the column placement strategy S. The read task for processing the query q can then access the columns specified by q one by one. The query seek cost may thus be expressed as follows:

$$\mathrm{Cost}(q,S)=\Sigma_{i=0}^{m-1}\mathrm{Cost}(c_{q,i},c_{q,i+1}),$$

$S=\{c_1, c_2, \ldots, c_n\}$ being the column placement strategy.

Because the table is partitioned into a number of row groups, and each row group follows the same column placement strategy, S, the seek cost of the query over the whole table will be proportional to the seek cost of a row group. Thus, the query seek cost above can be applied over the whole table. When the number of columns is small (e.g., <50), the query seek cost may not be significant. However, with larger tables, such as, for example, tables with greater than 1000 columns, the query seek cost becomes a significant part of the I/O cost. At least in part to decrease the I/O cost, order generation module 310 determines a new column order to optimize input/output efficiency.

To find an optimal column placement strategy $S^*=\{c_1, c_2, \ldots, c_n\}$, such that the overall query seek cost of Q is minimized:

$$S^* = \arg\min_{S} \sum_{q \in Q} (w_q \times \mathrm{Cost}(q, S)),$$

where q∈Q represents a weighted vector for the weight $w_q$ of each query. As described above, the weight $w_q$ for each query can represent a frequency and/or importance, and can be based on input from the workload manager module 304 and/or the user preference module 312. Absent specification or input regarding the weight of a particular query, the particular query can be assigned a default $w_q=1$.

Column Order Optimization

The order generating module 310 can process inputs through one or more algorithms (e.g., Simulated Annealing Based Column Ordering Algorithm (SCOA), Genetic Algorithm (GA), Frequency Algorithm, and the like) and determine a new column order with increased input/output efficiency (i.e., lower computational cost). As discussed above, the inputs can be from one or more of the workload management module 304, user preference module 312, hardware simulator module 314, and system setting module 318.

In some examples, the order generating module 310 can apply the SCOA algorithm to solve the order generating problem described above. Simulated annealing (SA), the basis of the SCOA algorithm, includes an iterative procedure that continuously updates the current state until the system reaches a state that is sufficient (e.g., a predetermined threshold), or until a given computation budget has been exhausted. In each iteration, SA considers some neighboring state S' of the current state S. A neighbor candidate state is generated by perturbing the current state. An Accept function can determine whether the neighbor state should be accepted or not. The Accept function can utilize a Temperature function and an Energy function for making this decision. The temperature returned by the Temperature function decreases (i.e., cools down) during the iteration process following a specific distribution, which is called an annealing schedule. The Energy function can be used to calculate the energy of a state. The objective of SA is to achieve a state with lowest energy. Thus, the neighbor state with the lowest energy can generally be more likely to be accepted.

With regard to the column ordering problem, a specific column order can constitute the state of the algorithm. For example, if there is a 'good' column order S, it is likely that there is a better state S' 'close' to S (i.e., S' and S are related to one another). Additionally the query seek cost of a column order in SCOA servers as the Energy function of SA.

An AcceptColumnOrder function of SCOA can make a decision between accepting or rejecting a neighbor state probabilistically. The distribution of the acceptance probability is determined by the annealing schedule. This can ensure that SCOA is not likely to trap into an undesirable local minimum at the beginning. For example, in at least one implementation, the temperature is relatively high at the beginning. However, as time goes by, the temperature drops exponentially, and the seek cost of the workload decreases accordingly. Thus, when the temperature is high, SCOA probabilistically explores the search space to avoid getting stuck in a local minimum. The probabilistic exploration can result in some fluctuations at the beginning, but as the temperature cools, the SCOA converges to generate a near optimal column order.

The SCOA algorithm can be represented as shown in TABLE 1.

TABLE 1

Requires:
The set of queries, Q = {$q_1, q_2, \ldots, q_m$}
The initial column order, $S_0$ = {$c_1, c_2, \ldots, c_n$}
Column and column size pair list, M = {($c_1$, s($c_1$)), ($c_2$, s($c_2$)), . . . , ($c_n$, s($c_n$))}, in which s($c_i$) is the size of column $c_i$.
Ensures:
The optimized column order S;
S := $S_0$, e := SeekCost($S_0$), t := init_temperature;
for k := 1 to $k_{max}$ do
  t := Temperature(t, cooling _rate );
  S' := Neighbor (S);
  e' := SeekCost(Q, M, S');
  if AcceptColumnOrder(e, e', t) then
    S := S';
    e := e';
  end if
end for
return S;

Given a workload Q, an initial column order $S_0$ and the data size of each column, SCOA returns a near optimal column ordering strategy S, so that the total I/O cost of Q is minimized. In SCOA, the main loop (paragraphs [0094]-[0102]) shows the iterative search process which is based on a cooling schedule. The Temperature function is the controlling function of the annealing schedule. In SCOA, the temperature can shrink at a rate of (1−cooling rate). The Neighbor(S) function is to obtain a candidate state that is transformed from the current column order S. A neighbor column order can be generated by swapping the location of two randomly chosen columns in the current column order. The seek cost of a column order can computed by the Seek Cost function input from the workload manager module 304.

The parameter represents the maximum number of iterations in the main loop, which controls the termination of SCOA. In various examples, $k_{max}$ is set large enough to ensure that initial_temperature*(1−cooling_rate)$^{kmax}$ nears zero. As the temperature approaches zero, it is unlikely to accept a worse candidate state with a higher seek cost, thus leading to convergence.

The AcceptColumnOrder function can be represented as shown in TABLE 2.

TABLE 2

Require:
The seek cost of S, e;
The seek cost of S', e';
The temperature, t;
Ensure:
If accept S' return true, else return false;
if e' < e then
  return true
else if random(0,1) < Prob(e, e', t) then
  return true;
else
  Return false;
end if As described in the algorithms of TABLE 1 and TABLE 2, a neighbor candidate state whose seek cost is lower than that of the current state will be directly accepted. Otherwise, it will be conditionally accepted with a threshold returned by the Prob function which is set as $$Prob(e, e', t) = \exp\left(\frac{e - e'}{t}\right),$$

and random(0,1) generates a random number between 0 and 1 under a uniform distribution.

The SCOA is but one illustrative example algorithm that the order generating module 310 can apply to the one or more inputs. Other example examples can use a genetic algorithm, a frequency algorithm, or any other algorithm for column ordering to achieve input/output optimization.

In various examples, after determining a new column order, the order generator module 310 can test the efficacy of the new column order prior to implementation. For example, the order generating module 310 can take a sample set of queries, and test for a decreased overall query seek cost.

The order generator module 310 can send the new column order to the distributed file system 316 for implementation. The order generator module 310 can send the new column order at a pre-determined time (e.g., daily, weekly, monthly), when the cost savings of the new order increases above a threshold level, and/or upon input from a user directing the update. In some examples, the order generating module 310 can additionally send instructions to implement the new column order to subsequently added data and/or pre-existing data. An instruction to implement the new column order to pre-existing data requires the distributed file system to re-save the table, in its entirety, thereby making the instruction computationally expensive. As such, the order generating module 310 may, in some examples, maintain a re-save cost threshold value, above which it would be more efficient to reorder columns, i.e., despite the computational cost of re-saving the totality of the table, the system would enjoy an overall increase in input/output efficiency and decrease in query seek cost.

Illustrative Processes

Figure 4:
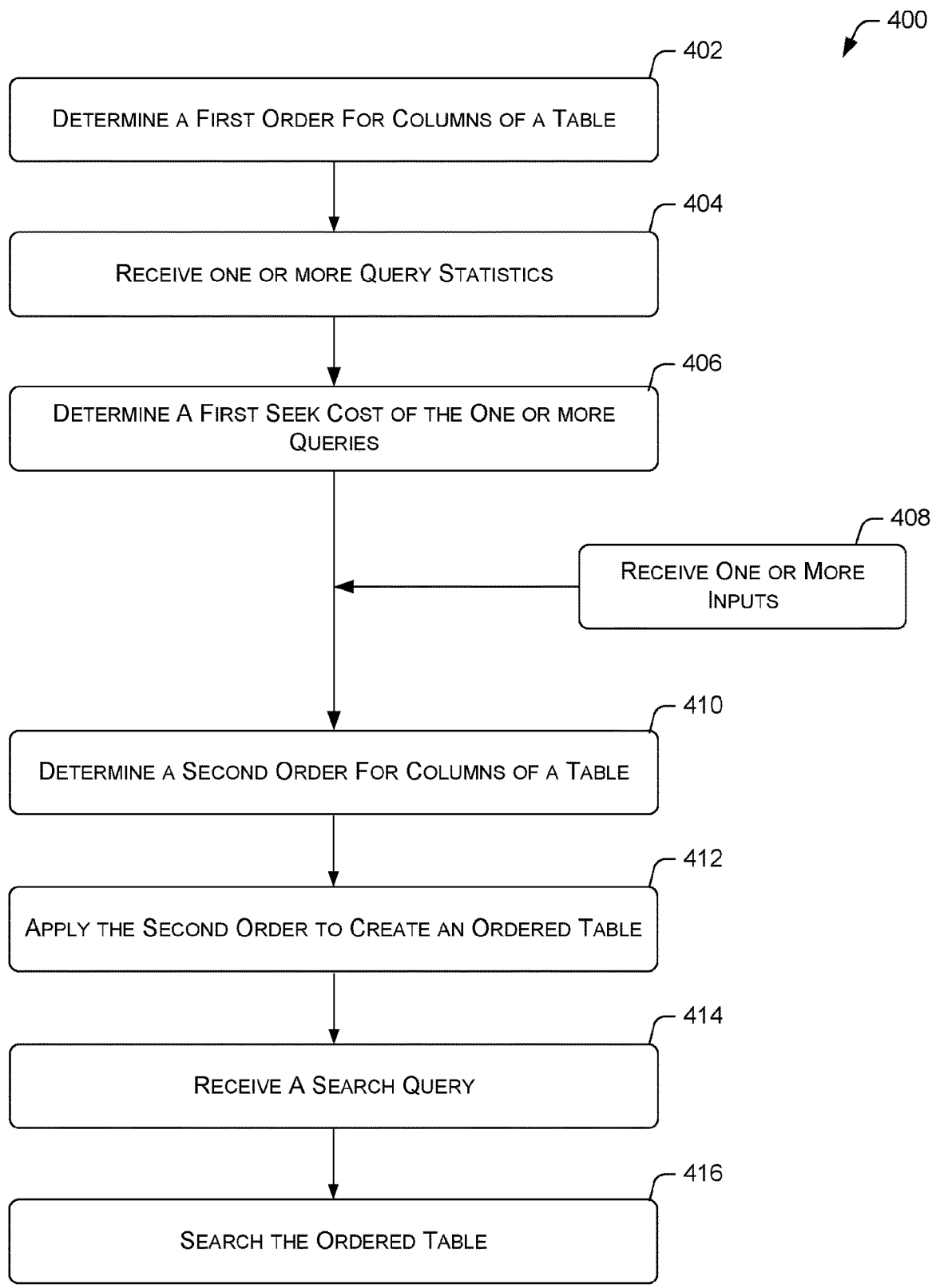
FIG. 4 is a flow diagram that illustrates a process flow of determining a new column order using a column ordering for input/output optimization system.
Figure 5:
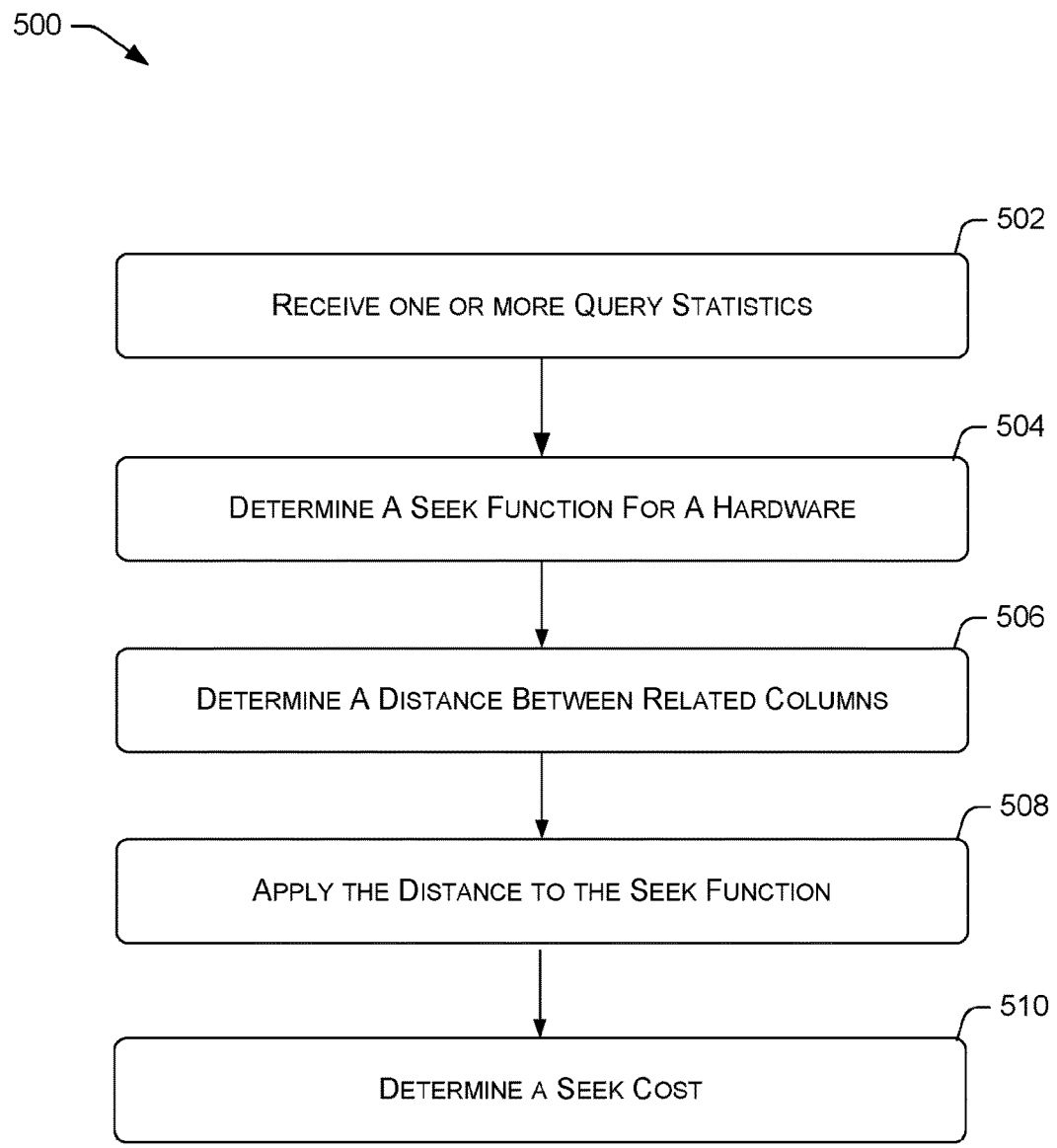
FIG. 5 is a flow diagram that illustrates a process flow of determining a seek cost in a column ordering for input/output optimization process.
Figure 6:
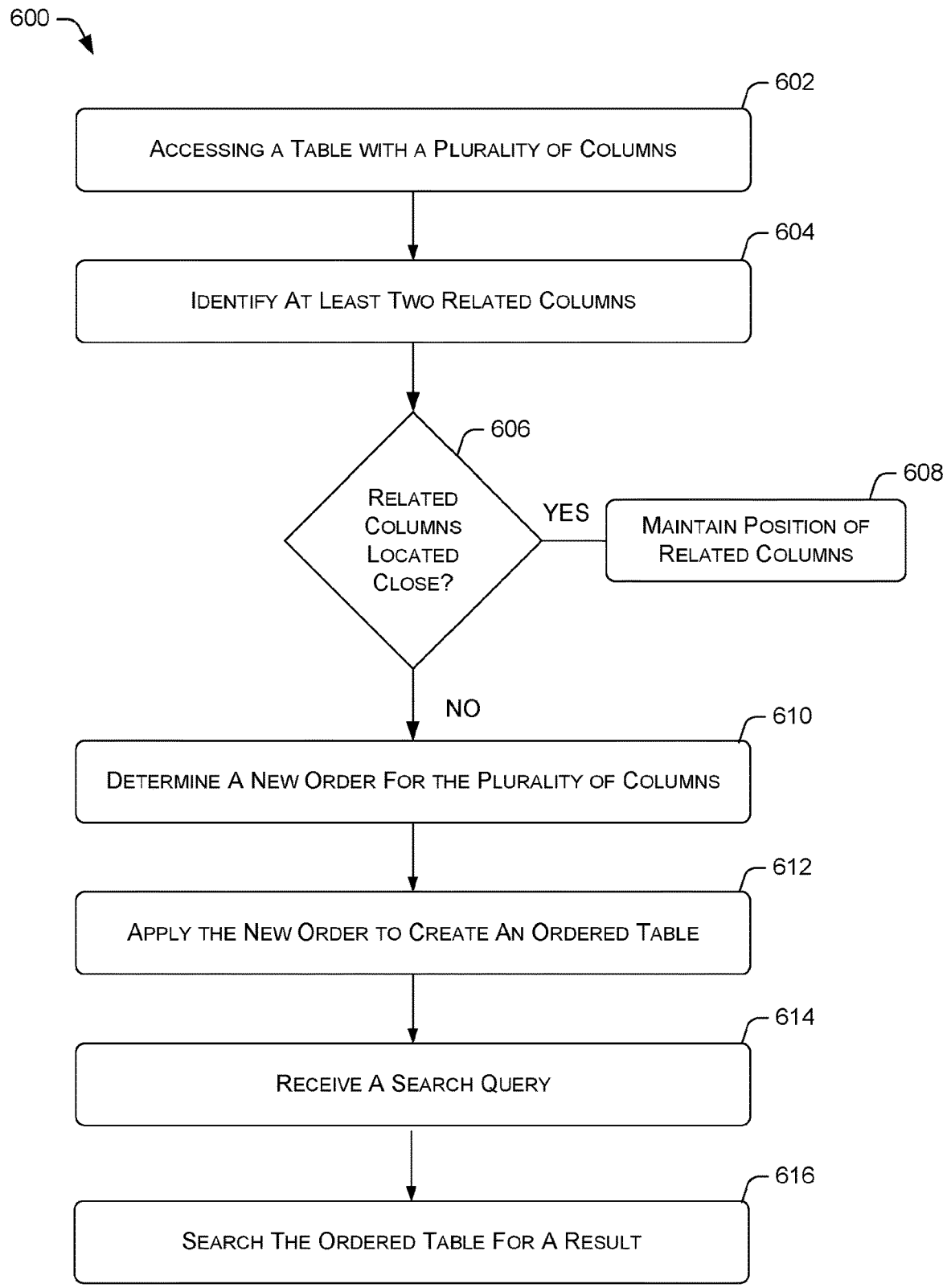
FIG. 6 is a flow diagram that illustrates a process flow of determining a new column order using a column ordering for input/output optimization system.

FIGS. 4, 5 and 6 are flow diagrams depicting example processes for a column ordering for input/output optimization. The operations of the example process are illustrated in individual blocks and summarized with reference to those blocks. The processes are illustrated as logical flows of blocks, each block of which can represent one or more operations that can be implemented in hardware, software, or a combination thereof.

FIG. 4 is a flow diagram that illustrates a process flow 400 of determining a new column order using a column ordering for input/output optimization system.

At block 402, a computing device, such as computing device 200, can determine a first order for columns of a table.

At block 404, the computing device can receive one or more query statistics associated with the table. The one or more query statistics can comprise a number of queries, a type of query, a list of columns accessed per query, and any other statistics relevant to the column ordering operation. In some examples, the computing device can receive the one or more query statistics periodically, such as, for example, daily. In some examples, the computing device can receive the one or more query statistics in response to a manual request for updated statistics from the computing system or from a user via the computing system.

At block 406, the computing device can process the query statistics received at block 404, and can determine a first seek cost of the one or more queries. For example, a first query may access three columns, and may have a first computational cost. As another example, a second query may access ten columns, and may have a second computational cost, the second computational cost being higher than the first computational cost. As yet another example, a third query may access two columns, and may have a third computational cost, the third computational cost being higher than the first and the second computational costs.

At block 408, the computing device can receive one or more inputs. The one or more inputs may include user preference data (e.g., a preference of one or more queries, and/or system parameters. In some examples, the user preference data can include instructions from the user to the system. For instance, the user preference data can include an instruction to enable or disable the column ordering system, to specifying a threshold for reordering, and/or to apply the column order to subsequently added, and/or pre-existing data.

In some examples, the one or more inputs can include hardware data associated with one or more hardware components storing the table. The data related to the one or more hardware component can include a type, performance characteristics, a capacity and/or other data related to the hardware component. For example, the hardware simulator module can determine that the data is stored on a 2 TB HDD with a 64 MB cache, and a rotation speed of 7,200 RPM and a Serial ATA of 6.0 Gb/s, or some other configuration.

In some examples, the one or more inputs can include system parameters associated with the distributed file system. The system parameters can comprise a column compression, a row size, a data type, a row type, and any other parameters related to the data storage within the distributed file system.

At block 410, the computing device can determine a second order for columns of the table based on one or more of the query statistics, the user preference data, the hardware data, the seek cost, and the system parameters. In some examples, the computing device can determine the second column order using a simulated annealing column ordering algorithm (SCOA). In some examples, the computing device can determine the second column order using a genetic algorithm or a frequency algorithm.

At block 412, the computing device can apply the second order for columns of the table to create an ordered table. In some examples, the application can include sending the second order to a distributed file system with an instruction to apply the second order. The instruction to apply can include an instruction to apply the second column order to the columns of the table and/or to data that is added to the table subsequent to the determination of a second order for the columns.

At block 414, the computing device may receive an input/output request, such as a search query.

At block 416, the computing device may search the ordered table for a result to the search query.

FIG. 5 is a flow diagram that illustrates a process flow 500 of determining a seek cost in the column ordering for input/output optimization process.

At block 502, similar to block 404, the computing device can receive one or more query statistics associated with the table. The one or more query statistics can comprise a number of queries, a type of query, a list of columns accessed per query, and any other statistics relevant to the column ordering operation. In some examples, the computing device can receive the one or more query statistics periodically, such as, for example, daily. In some examples, the computing device can receive the one or more query statistics in response to a manual request for updated statistics from the computing system or from a user via the computing system.

At block 504, the computing device can determine a seek function for one or more hardware components storing the table. The seek function can abstract the actual properties of the physical hardware component and can vary across different models, versions and/or stock keeping units (SKUs).

At block 506, the computing device can determine a distance between related columns. In some examples, the related columns can be two or more columns that are likely to be accessed together in a query. The related columns can be determined by the one or more query statistics received at block 404.

At block 508, the computing device can apply the distance between related columns to the seek function.

At block 510, as a result of applying the distance to the seek function, the computing device can determine a seek cost (i.e., a computational cost) for a query, the seek cost being hardware-specific.

FIG. 6 is a flow diagram that illustrates a process flow 600 of determining a new column order using a column ordering for input/output optimization system.

At block 602, the computing device can access a table with a plurality of columns.

At block 604, the computing device can identify at least two related columns. The related columns can be any two or more columns likely to be accessed together in a query. In some examples, the at least two related columns may be identified by one or more query statistics.

At block 606, the computing device may determine whether the related columns are close together. In various examples, a determination of whether columns are close together can be based, at least in part, on whether the related columns are physically located close together. In some examples, a determination of whether the related columns are close together can be based, at least in part, on a determination that the related columns can be accessed quickly together. The determination of whether the related columns can be accessed quickly together can be based on a seek cost to access the related columns. The seek cost can be based on a seek function of the hardware components storing the table, and a distance between the columns.

At block 608, the computing device can determine that the related columns are located close to one another, and may maintain the position of the related columns.

At block 610, the computing device can determine that the related columns are not located close to one another, and may determine a new order for the plurality of columns. In some examples, the new order may be determined based upon one or more of query statistics, user preferences, hardware data, and/or system parameters.

At block 612, the computing device can apply the new order to create an ordered table, the ordered table configured with columns ordered to optimize input/output efficiency. In some examples, the application of the new order may include sending implementation instructions to a distributed file system storing the table. The implementation instructions can include an instruction to apply the new order to the columns of the table and/or to data that is added to the table subsequent to the determination of the new order.

In some examples, the implementation instructions can be based at least in part on user preference data. For example, a user can enable or disable the column ordering process. In such an example, upon the user enabling the column ordering process, the computing device can calculate a new order and send a signal to the distributed file system to implement. For another example, a user can determine a threshold, above or below which computing device automatically re-calculates an order and sends it to the distributed file system to implement.

At block 614, the computing device may receive an input/output request, such as a search query.

At block 616, the computing device may search the ordered table for a result to the search query.

Example Clauses

A: A computer-implemented method comprising: ascertaining a first order of columns of a table, the table comprising a plurality of columns; receiving statistics associated with one or more queries; determining a first cost for the one or more queries based at least in part on the statistics; determining a second order of columns of the table, the second order of columns having a lower cost than the first cost; and applying the second order of columns to create an ordered table.

B: A method as paragraph A describes, wherein the determining the first cost for the one or more queries comprises: determining a seek function for a hardware storing the table, determining a distance between at least two related columns of the plurality of columns; applying the distance to the seek function; and determining a cost.

C: A method as either paragraph A or paragraph B describes, further comprising: receiving one or more inputs related to at least one of: a user preference associated with the table; a hardware component; and a system parameter, wherein the determining the second order of columns of the table is based at least in part on the one or more inputs.

D: A method as paragraphs A-C describe, wherein the ordered table comprises: the table configured in the first column order; and data added subsequent to a determination of the second order of columns.

E: A method as paragraphs A-C describe, wherein the ordered table comprises: the table and data added subsequent to a determination of the second order of columns.

F: A method as paragraphs A-C describe, further comprising: receiving a query; and searching the ordered table for a result to the query.

G: A computer-readable medium having thereon computer-executable instructions that responsive to execution configure a computer to perform a method as any one of paragraphs A-F describes.

H: A device or system comprising: a processor; and a computer-readable medium coupled to the processor, the computer-readable medium including instructions to configure one or more devices to perform a method as any of paragraphs A-F describes.

I: A device or system comprising: means for processing; and means for storing coupled to the means for processing, the means for storing, storing instructions to configure one or more devices to perform a method as any of paragraphs A-F describes.

J: A computer-implemented method comprising: accessing a table comprising a first plurality of columns; identifying at least two related columns of the first plurality of columns; determining whether the at least two related columns of the first plurality of columns are close to one another; responsive to determining the at least two related columns of the first plurality of columns are not close to one another, determining a new order for the first plurality of columns based at least in part on locating the at least two related columns close to one another; and applying the new order to a second plurality of columns to create an ordered table, the second plurality of columns being added to the table subsequent to the a determination of the new order.

K: A method as paragraph J describes, wherein the identification of the at least two related columns comprises a determination that the at least two related columns will likely be accessed together.

L: A method as paragraphs J-K describe, wherein the determining whether the at least two related columns of the plurality of columns are close to one another is based at least in part on a distance model.

M: A method as paragraphs J-L describe, further comprising: identifying a column in the table not relevant to the search query; and removing the column from the table prior to the searching the table for the result to the search query.

N: A method as paragraphs J-M describe, further comprising: applying the new order to the first plurality of columns.

O: A method as paragraphs J-N describe, wherein the identifying the at least two related columns of the plurality of columns comprises: receiving statistics associated with a query; and identifying two or more columns accessed in response to the query.

P: A method as paragraphs J-O describe, further comprising: receiving a query; and searching the ordered table for a result to the query.

Q: A computer-readable medium having thereon computer-executable instructions that responsive to execution configure a computer to perform a method as any one of paragraphs J-P describes.

R: A device or system comprising: a processor; and a computer-readable medium coupled to the processor, the computer-readable medium including instructions to configure one or more devices to perform a method as any of paragraphs J-P describes.

S: A device or system comprising: means for processing; and means for storing coupled to the means for processing, the means for storing, storing instructions to configure one or more devices to perform a method as any of paragraphs J-P describes.

T: A computer-readable medium having thereon computer-executable instructions, the computer-executable instructions responsive to execution configuring a device to perform operations comprising: accessing a table comprising a first plurality of columns; identifying at least two related columns of the first plurality of columns; determining whether the at least two related columns of the first plurality of columns are close to one another; responsive to determining the at least two related columns of the first plurality of columns are not close to one another, determining a new order for the first plurality of columns based at least in part on locating the at least two related columns close to one another; and applying the new order to a second plurality of columns to create an ordered table, the second plurality of columns being added to the table subsequent to the determining the new order for the first plurality of columns.

U: A computer-readable medium as paragraph T describes, wherein the identification of the at least two related columns comprises a determination that the at least two related columns will likely be accessed together while accessing the ordered table for a result to a query.

V: A computer-readable medium as paragraphs T-U describe, wherein the determining whether the at least two related columns of the plurality of columns are close to one another is based at least in part on a seek cost.

W: A computer-readable medium as paragraphs T-V describe, further comprising: identifying a column in the table not relevant to a query; and removing the column from the table prior to searching the table for the result to the query.

X: A computer-readable medium as paragraphs T-W describe, further comprising: applying the new order to the first plurality of columns.

Y: A computer-readable medium as paragraphs T-X describe, wherein the identifying the at least two related columns of the plurality of columns comprises: receiving statistics associated with a query; and identifying two or more columns accessed in response to the query.

Z: A computer-readable medium as paragraphs T-Y describe, the operations further comprising: receiving a query; and searching the ordered table for a result to the query.

AA: A device or system comprising: a processor; and a computer-readable medium as any of paragraphs T-Z describes coupled to the processor.

AB: A device or system comprising: means for processing; and means for storing coupled to the means for processing, the means for storing, storing instructions to configure one or more devices to perform a method as any of paragraphs T-Z describes.

AC: A system comprising: a processor; a memory storing a column ordering framework for actuation by the processor, the column ordering framework comprising: a workload manager module configured and process data regarding a first column layout of tabular storage to determine a query workload associated with the first column layout; and an order generating module configured to calculate a second column layout for the tabular storage based at least in part on the query workload.

AD: A system as paragraph AC describes, wherein the data comprises at least one of: a frequency of a query; a list of columns accessed for the query; a time stamp for the query; or a seek cost for the query.

AE: A system as paragraphs AC-AD describe, wherein the order generating module is further configured to apply the second column layout of the tabular storage to data added subsequent to the calculation of the second column layout.

AF: A system as paragraphs AC-AE describe, wherein the column ordering framework further comprises: a user preference module configured to receive and process user preference inputs regarding the table; a hardware simulator module configured to receive data associated with the hardware storing the table; and a system setting module configured to receive system settings related to the table.

AG: A system as paragraph AF describes, wherein the user preference inputs comprise at least one of: an input to enable the column ordering framework; an input to disable the column ordering framework; a preference for one or more queries; or an efficiency threshold for calculating the second column layout of the table.

AH: A computer-readable medium having thereon computer-executable instructions that responsive to execution configure a computer to perform a system as any one of paragraphs AC-AG describes.

AI: A device or method comprising: a processor; and a computer-readable medium coupled to the processor, the computer-readable medium including instructions to configure one or more devices to perform a method as any of paragraphs AC-AG describes.

AJ: A device or method comprising: means for processing; and means for storing coupled to the means for processing, the means for storing, storing instructions to configure one or more devices to perform a method as any of paragraphs AC-AG describes.

AK: A device comprising: a workload manager module configured to receive and process the data regarding a first order of columns of a table; a user preference module configured to receive and process user preference inputs regarding the table; a hardware simulator module configured to receive data associated with the hardware storing the table; a system setting module configured to receive system settings related to the table; and an order generating module configured to receive inputs from one or more of the workload manager module, the user preference module, the hardware simulator module, and the system setting module, and calculate a second order of columns of the table.

AL: A device as paragraph AK describes, wherein the data comprises at least one of: a frequency of a query; a list of the columns accessed for the query; a time stamp for the query; or a seek cost for the query.

AM: A device as paragraphs AK-AL describe, wherein the order generating module is further configured to apply the second order of columns of the table to subsequently added data.

AN: A device as paragraphs AK-AM describe, wherein the user preference inputs comprise at least one of: an input to enable the column ordering framework; an input to disable the column ordering framework; a preference for one or more queries; or an efficiency threshold for calculating the second order of columns of the table.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

The invention claimed is:

1. A system comprising:
a processor;
a memory storing a column ordering framework, for actuation by the processor, the column ordering framework comprising:
a workload manager module configured to:
receive query statistics associated with received queries for a data storage table;
process the received query statistics to determine a first seek cost; and
weight the received queries based on the processed query statistics;
a user preference module configured to receive and process user preference inputs, wherein the received user preference inputs include an indication of an importance of one or more of the received queries;
a hardware simulator module configured to:
receive hardware data related to hardware components of the data storage table;
process the received hardware data; and
calculate, from the processed hardware data, a hardware seek cost for processing queries on the data storage table;
an order generating module configured to:
receive the weighted queries, the processed user preference inputs, the determined first seek cost, and the calculated hardware seek cost; and
determine a new column order for reordering the data storage table based at least in part on the weighted queries, the processed user preference inputs, the determined first seek cost, and the calculated hardware seek cost; and
a distributed file system configured to:
reorder the data storage table based on the new column order; and
search the reordered data storage table based on a new received query.

2. The system of claim 1, wherein the query statistics comprises at least one of:
a frequency of a query;
a list of columns accessed for the query;
a time stamp for the query; or
a computational seek cost for the query.

3. The system of claim 1, wherein the column ordering framework further comprises a system setting module configured to receive system settings related to the data storage table.

4. The system of claim 1, wherein the calculated hardware seek cost is based on a seek distance between two columns accessed and located on hardware storing the data storage table.

5. The system of claim 4, wherein a query workload is based on the calculated hardware seek cost.

6. The system of claim 1, wherein the received query statistics include a number of columns accessed.

7. The system of claim 1, wherein the user preference inputs are based on a subscription status of a user.

8. The system of claim 1, further comprising performing a search query on the new column order of the data storage table.

9. A computer-implemented method, comprising:
ascertaining a first order for columns of a data storage table, the data storage table being stored on a hardware component and comprising the columns;
identifying two related columns in the columns of the data storage table;
determining a first seek cost based at least in part on hardware data associated with the two related columns;
in response to determining the two related columns are not close to each other based on the first seek cost, determining a second order for the columns of the data storage table based on determining that a second seek cost for accessing the two related columns in the second order is less than the first seek cost for accessing the two related columns in the first order;
reordering the columns of the data storage table to the second order; and
searching the second order.

10. The method of claim 9, wherein determining the second order for columns of the data storage table is based at least in part on one or more received inputs.

11. The method of claim 9, wherein the reordered data storage table comprises:
the data storage table configured in the first order; and
data added subsequent to a determination of the second order in the second order.

12. The method of claim 9, wherein determining the second order for reordering the columns of the data storage table comprises receiving and processing received query statistics, a user preference, and the determined first seek cost.

13. The method of claim 12, wherein the user preference is based on a subscription status of a user associated with the obtained user preference.

14. The method of claim 12, wherein the received query statistics include information based on a seek distance between the two related columns.

15. A computer-readable medium having thereon computer-executable instructions, the computer-executable instructions responsive to execution configuring a device to perform operations comprising:
accessing a data storage table stored on a hardware component, the data storage table comprising a first plurality of columns;
identifying at least two related columns of the first plurality of columns;
calculate a hardware seek cost based on hardware data associated with the identified at least two related columns;
determining whether the identified at least two related columns are close to one another based at least in part on the calculated hardware seek cost associated with the identified at least two related columns;
responsive to determining the at least two related columns are not close to one another, determining a new order for the first plurality of columns of the data storage table based at least in part on determining that a hardware resource cost associated with accessing each column of the two related columns in the new order is less than the hardware resource cost associated with accessing each column of the two related columns in a previous order;
applying the new column order to a second plurality of columns to implement the new column order for the data storage table, the second plurality of columns being added to the data storage table subsequent to the determining the new order for the first plurality of columns; and
search the newly ordered data storage table based on a new received query.

16. The computer-readable medium of claim 15, wherein the identifying at least two related columns comprises a determination that the at least two related columns will likely be accessed together.

17. The computer-readable medium of claim 15, wherein determining whether the at least two related columns are close to one another is based at least in part on the calculated hardware seek cost.

18. The computer readable medium of claim 15, wherein the new order is further determined based on preferences received from a user that indicate an importance of the new received query.

19. The computer-readable medium of claim 15, wherein the calculated hardware seek cost associated with accessing each column of the two related columns is based on a distance between each column of the two related columns applied to a seek cost function of the hardware component storing the two related columns.

20. The computer-readable medium of claim 15, wherein the ordering is based on one or more user preferences indicating a subscription status of a user associated with the one or more user preferences.

* * * * *